United States Patent
Korst et al.

(10) Patent No.: US 7,096,327 B2
(45) Date of Patent: Aug. 22, 2006

(54) SYSTEM FOR AND METHOD OF ACCESSING BLOCKS ON A STORAGE MEDIUM

(75) Inventors: Johannes Henricus Maria Korst, Eindhoven (NL); Nicolaas Lambert, Eindhoven (NL); Ronald Marcel Tol, Eindhoven (NL); Adrianus Johannes Maria Denissen, Eindhoven (NL); Marcel Lambertus Leonardus Bijsterveld, Eindhoven (NL); Hong Li, Eindhoven (NL); Robert Jochemsen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1136 days.

(21) Appl. No.: 09/785,581

(22) Filed: Feb. 16, 2001

(65) Prior Publication Data
US 2001/0032293 A1    Oct. 18, 2001

(30) Foreign Application Priority Data
Mar. 24, 2000    (EP) .................................. 00201075

(51) Int. Cl.
*G06F 12/00*    (2006.01)

(52) U.S. Cl. ....................................................... 711/154

(58) Field of Classification Search ................ 711/100, 711/154, 156, 167, 170, 171, 172, 173
See application file for complete search history.

(56) References Cited

U.S. PATENT DOCUMENTS

| 5,890,168 | A | 3/1999 | Lawerman |
| 5,950,015 | A | 9/1999 | Korst |
| 6,477,541 | B1 * | 11/2002 | Korst et al. .............. 707/104.1 |

* cited by examiner

Primary Examiner—Tuan V. Thai
(74) Attorney, Agent, or Firm—Larry Liberchuk

(57) ABSTRACT

A system (100, 300) like a video on demand server has a storage medium (106) with a number of files (200) from which data can be fetched or in which data can be stored. A file contains a number of clusters (202, 204, 206) and each cluster contains a number of storage sectors (208) that are physically successively organized on the storage medium. When a new stream is requested, either for reading or writing, a block size (210) is determined for the new stream. The block size is large enough to support the rate of the stream and is chosen such that a cluster can be read with an integer number of blocks by evenly partitioning the size of the cluster into the size of the blocks reading the cluster.

10 Claims, 2 Drawing Sheets

SYSTEM FOR AND METHOD OF ACCESSING BLOCKS ON A STORAGE MEDIUM

Figure 1:
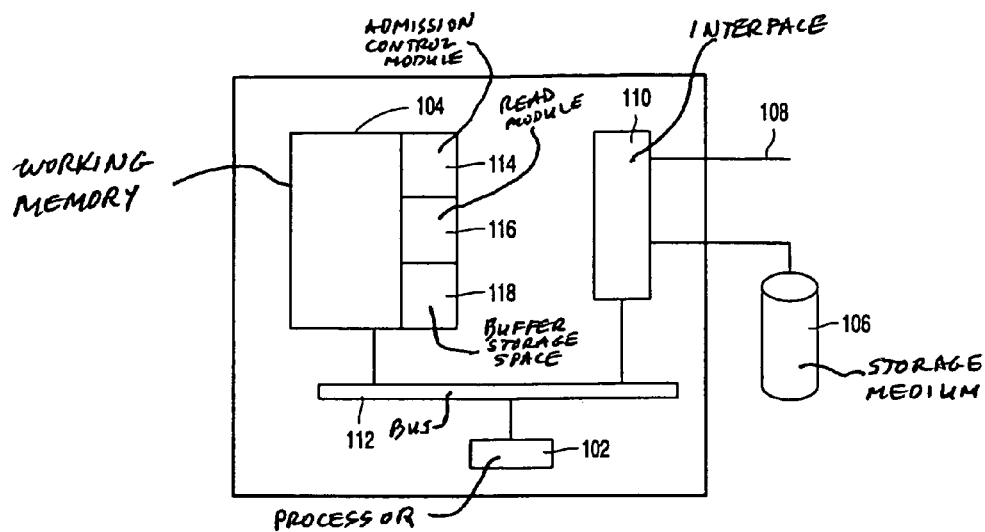

The invention relates to a system for periodically fetching blocks of data from a storage medium and supplying the blocks in the form of streams, wherein the blocks of data are fetched from a file comprising logically successive clusters, a cluster having a cluster size C and having physically successive storage sectors for holding the data, the system comprising admission control means for controlling the admission of a new stream having a maximum bit rate $c^{max}$ and read means for in a period of maximum duration P fetching blocks of data from the storage medium for respective ones of the streams.

The invention further relates to a system for periodically writing blocks of data to a storage medium, whereby the blocks are received in the form of streams, wherein the blocks of data are stored into a file comprising logically successive clusters, a cluster having a cluster size C and having physically successive storage sectors for storing the data, the system comprising admission control means for controlling the admission of a new stream having a maximum bit rate $c^{max}$ and write means for in a period of maximum duration P storing blocks of data to the storage medium for respective ones of the streams.

The invention further relates to a method of periodically fetching blocks of data from a file on a storage medium and supplying the blocks in the form of streams, wherein the blocks of data are fetched from a file comprising logically successive clusters, a cluster having a cluster size C and having physically successive storage sectors for holding the data, the method comprising the steps of controlling the admission of a new stream having a maximum bit rate $c^{max}$, and periodically fetching blocks of data from the storage medium for respective ones of the streams, a period having a maximum duration P.

The invention further relates to a method of periodically writing blocks of data to a file on a storage medium, whereby the blocks are received in the form of streams and whereby the blocks of data are stored into a file comprising logically successive clusters, a cluster having a cluster size C and having physically successive storage sectors for storing the data, the method comprising the steps of controlling the admission of a new stream having a maximum bit rate $c^{max}$, and periodically storing blocks of data to the storage medium for respective ones of the streams, a period having a maximum duration P.

U.S. Pat. No. 5,890,168 describes a system known as a video-on-demand server. Such a server comprises one or more discs on which files are stored. A file typically contains a movie, which the server presents to the user on demand. A file on disc is organized in a number of clusters which have a logical order and which may further be distributed on the disc. These files typically have such a large size that it is note desirable to store each of them contiguously on the disc. Removing and adding such contiguous files would introduce large fragmentation of the disc, which would be difficult to remedy. A cluster comprises physically successive sectors with the data of the file. The sectors with the data of the files are fetched from the disc by blocks so as to be placed in a buffer wherefrom the data are presented to the user in the form of a stream with a rate that corresponds with the timing of the movie.

The video-on-demand server is designed to sustain the stream at the required rate so as to guarantee uninterrupted viewing by the user. A known way to realize this is the double buffer strategy. The size of a block of data fetched from disc equals the size of the user buffer, so that the buffer is always completely filled by a fetched block. In the double buffer strategy, the system has two buffers for a user: while the first buffer is filled with data being presented to the user, the second buffer is available so as to be filled with the next block from the disc. The system operates in cycles with such a maximum duration that the next block is present in the second buffer before all data in the first buffer have been presented. At that instant the first and the second buffer change functions and the process is repeated in the next cycle.

Fetching a block for the user buffer from the file on disc generally requires one seek operation by the head on the disc, because the sectors to be fetched are physically successively arranged in the cluster. Therefore, the block to be read must completely reside in a cluster since otherwise a second seek operation would be necessary to move to the position of the next cluster of the file. In the system described in U.S. Pat. No. 5,890,168, the data in a number of sectors at the end of a cluster of a file are repeated in the sectors at the start of the logically next cluster of that file. This allows that reading a block of data may start at an arbitrary position in the file while it still requires only one seek operation, provided that the repeated number of sectors is not smaller than the size of the block to be read. Furthermore, the repetition gives a flexibility in the choice of the size of the block while reading the block still requires one seek operation, because a single block completely resides in a cluster. Again provided that the repeated number of sectors is not smaller than the block size. Repeating the data in a number of sectors requires additional storage space on the disc. Particularly if the system must support a relatively large block size, the additional storage space forms a substantial part of the total storage space. Furthermore, the system storing a file with data repetition requires additional bandwidth to the disc to allow for the copying of the data or, if the copying is delayed, it requires additional bookkeeping to later copy the data.

It is an object of the invention to provide a system for fetching blocks of data as described in the preamble in which the problems of the known system are solved. This object is achieved according to the invention in system that is characterized in that the admission control means is arranged to determine a minimal block size $B_{lower}$ for the blocks for the new stream whereby a block of size $B_{lower}$ is sufficiently large to sustain consumption at rate $c^{max}$ during a period of length P, to determine the number of times k a block of size $B_{lower}$ fits in the cluster of size C, and to determine for k blocks to be used for reading the cluster a respective block size by evenly spreading the k blocks over the cluster so as to arrange that the cluster can be completely read by means of the k blocks. By exactly dividing the cluster to be read into an integer number of blocks, while the blocks are large enough to guarantee an uninterrupted stream, each block can be read with one seek operation. The inventors have realized that it is possible to adapt the size of the blocks used for reading to the size of the cluster, such that the blocks together exactly partition the cluster. This is done by allowing blocks used for reading a single cluster to have mutually different block sizes.

An embodiment of the system for fetching blocks of data according to the invention is described in claim 2. This is a clear and easy to calculate minimum block size for the blocks of the new stream.

An embodiment of the system for fetching blocks of data according to the invention is described in claim 8. As long as the largest block size of the new stream is determined small enough that this equation is met, a block of data can be retrieved for all of the streams, i.e. the existing streams and the new stream to be admitted, within the period of the system.

An embodiment of the system for fetching blocks of data according to the invention is described in claim 5. Choosing the block size of the new stream as a divisor of the size of the cluster, within the limitations described above, is an easy way to directly realize the situation that a cluster can be read with an integer number of blocks.

An embodiment of the system for fetching blocks of data according to the invention is described in claim 6. It is advantageous to have a cluster size with many divisors since then it is often possible to choose a block size for the blocks used for reading the cluster that is equal to the minimal block size or only a little larger than this minimal block size. It is advantageous to choose the block size as small as possible since this saves bandwidth when blocks are read from the storage medium for this particular stream and hence allows more streams to be serviced from the same storage medium. Furthermore it saves memory space for buffers in which the blocks are temporarily stored for consumption.

It is a further object of the invention to provide a system for writing blocks of data as described in the preamble in which the problems of the known system are solved. This object is achieved according to the invention in system that is characterized in that the admission control means is arranged to determine a minimal block size $B_{lower}$ for the blocks for the new stream whereby a block of size $B_{lower}$ is sufficiently large to store data received at rate $c^{max}$ during a period of length P, to determine the number of times k a block of size $B_{lower}$ fits in the cluster of size C, and to determine for k blocks to be used for writing to the cluster a respective block size by evenly spreading the k blocks over the cluster so as arrange that the cluster can be completely written by means of the k blocks. This allows that the storage medium is organized into a number of clusters of a certain cluster size to be used for files with data. Upon receiving a request for admitting a new stream, the block size for the blocks that are written to such a file can now be chosen in dependence on the new stream while it is still possible to write one block with one seek operation.

Determining the block size for writing blocks of data is carried out in a way that is analogous with determining the block size for fetching blocks of data.

Various advantageous embodiments are recited in the dependent claims.

Figure 2:
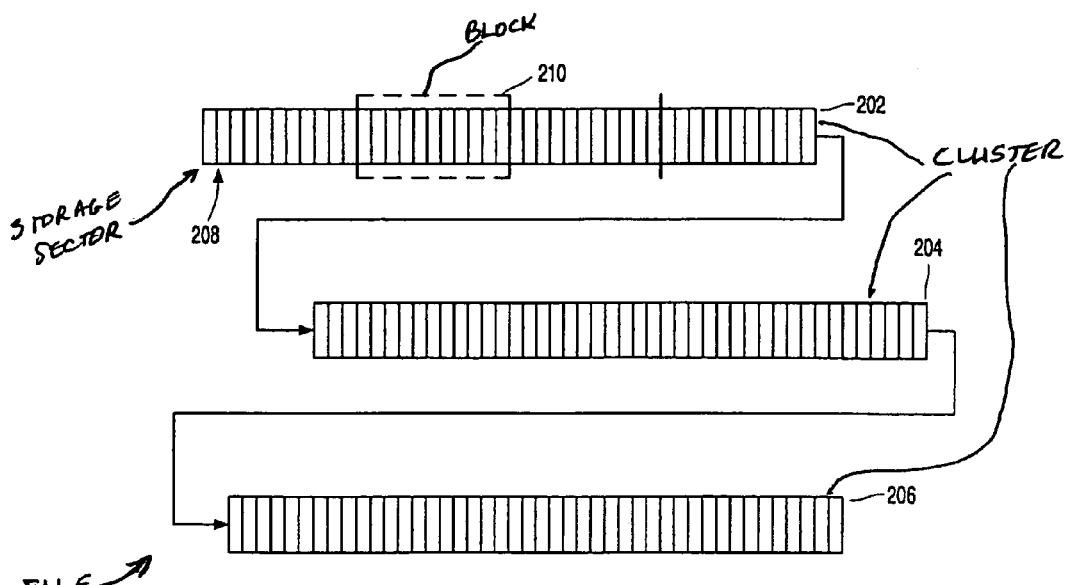
Figure 3:
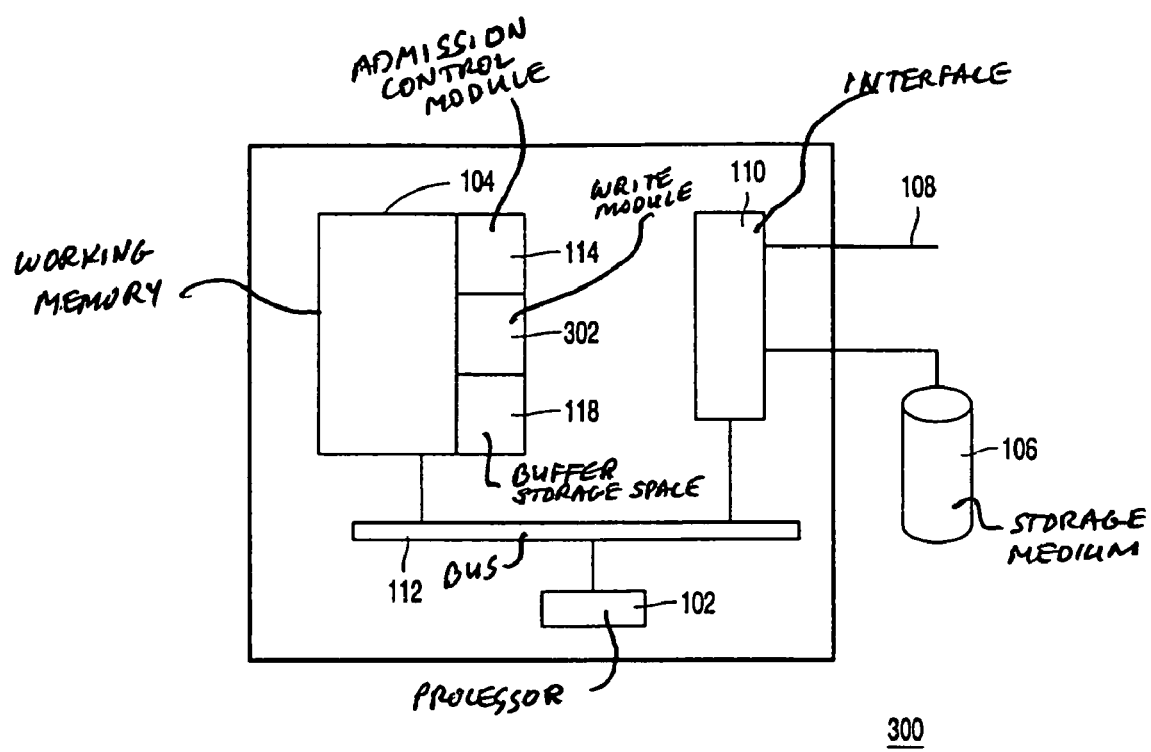

The invention and its attendant advantages will be further elucidated with the aid of exemplary embodiments and the accompanying schematic drawing, wherein:

FIG. 1 schematically shows a system for fetching blocks of data according to the invention, FIG. 2 schematically shows the organization of a file on the storage medium, and FIG. 3 schematically shows a system for periodically writing blocks of data to a storage medium according to the invention.

Corresponding features in the Figures are denoted by the same reference symbols.

FIG. 1 schematically shows a system for fetching blocks according to the invention. The system is constructed on the basis of a general-purpose computer with a known architecture. The system has a processor 102 for executing program instructions of a program loaded in working memory 104. The system further comprises a storage medium 106 for storage of the file with data that are to be supplied to a user. The storage unit can be a disc or array of magnetic hard discs, but other suitable storage devices can be used e.g. optical discs. The system is typically suitable for supplying data to a number of users. The data are supplied to these users via a connection 108, which can provide access to a network to which the users are connected, e.g. via coax cable. The system has an interface 110 for communicating with external peripherals, like the storage medium 106 and the connection 108. Furthermore, the system has a bus 112 for exchanging commands and data between the various parts of the system.

The functionality of the system is implemented by a number of program modules that are loaded into the working memory. The system has an admission control module 114 that verifies whether a request for a new stream can be granted and if so, initializes this new stream. The system has a read module 116 that reads blocks of data from the storage medium and puts them in a buffer storage space 118 from where they can be consumed by the particular user as a stream at the desired rate. Typically, each user being serviced has a buffer from where the respective user receives his stream of data. The system operates in periods of a maximum duration P. At the beginning of such a period it is examined for which of the streams a block of data can be fetched in this period. Then these blocks are fetched during this period and put into the buffers for consumption in the next period. The system is organized in such a way that the user buffer does not underflow nor overflow. Therefore a block of data is only fetched when there is room for it in the user buffer and furthermore, at the beginning of a period each buffer has at least enough data to be consumed during the maximum duration P. An example of a strategy to realize this is the dual sweep strategy described in U.S. Pat. No. 5,950,015. In this strategy, a user has a buffer that can hold two blocks of data. A user is serviced typically once every other sweep, which is a cycle for accessing the storage device. The dual sweep strategy allows for streams of variable bit rates without a substantial increase of the buffer size. Various other buffer strategies are possible, depending on the situation in which the system is to be used, and the present invention is not restricted to a particular strategy.

FIG. 2 schematically shows the organization of a file on the storage medium. The file 200 has clusters 202, 204 and 206, which need not be physically successively stored with respect to each other on the storage medium, which is a disc in this embodiment. The clusters do have a logically successive order in that the sectors contain temporal data in relation with the real time of the audio or video segment represented by the data. For normal reproduction, the clusters will be read in this logically successive order. The fact that the individual cluster may be freely placed on the discs avoids the need to allocate a large consecutive area per file on the disc. This makes it easier to manage multiple files per disc, e.g. moving files, deleting files and adding new files. A cluster contains a number of storage sectors that are physically successively stored on the disc; e.g. cluster 202 has a number of storage sectors of which storage sector 208 is an example. The storage sectors contain the data that make up the contents of the file. A storage sector is the smallest amount of data that may be read from or written to the disc. Reading a sector requires some switching overhead, this involves a period for positioning the reading head to the location of the sector, and a transfer period for actually copying the data from the disc into a buffer in memory. The same holds for writing data to a data sector. In case of a disc, the switching overhead involves a radial movement of the reading head to the particular track containing the desired sector and a rotational latency for waiting until the starting point of the desired sector passes under the reading head. The switching overhead is far larger than then the transfer period for transferring a single sector. The switching overhead is in the order of 10 ms whereas this transfer period is in the order of 0.1 ms. In order to use the disc efficiently, data are accessed per group of sectors called a block. Reading a block of sectors requires one period with switching overhead for positioning the read head to the first sector of the block and one transfer period for transferring all the sectors. This under the condition that the sectors are successively stored so that the reading head need not be moved to another position between reading sectors. Some typical numbers in this embodiment are that a sector is 512 bytes, a cluster around 10 Mbytes and a file 1 Gbytes. The block size is chosen in dependence on the particular application accessing the file, as is explained below, and can for example be 128 Kbytes.

As described above, the system operates in periods of maximum duration P. The system is designed such that a block of data can be fetched for each of the streams within a period of duration P. To use the disc as efficiently as possible in order to service as many streams as possible, a block of data is to be fetched in a way that only involves a single access to the disc, i.e. only a single switching overhead. This means that a block of data to be fetched must entirely reside in one cluster. If the block resided in two clusters, a second positioning of the read head would be necessary since the storage sectors of the next cluster are not consecutive of the sectors at the end of the first cluster. FIG. 2 shows an example of a block 210 to be read comprising 11 sectors while the whole cluster comprises 44 sectors. This means that the cluster can be exactly read with 4 blocks, so that also the last block can be read in one access to the disc. These numbers are for illustrative purpose only, since actual numbers will be higher. It is desirable to access a file with an actual block size that fits the accessing application. For instance when the file is read for a stream with a relatively high consumption rate, the block size is preferably large, while if the file is read for a stream with a relatively low consumption rate, the block size is preferably small. In most situations, it is advantageous to use for a stream a block size that is proportional to the consumption rate of the respective stream. An example of two such different applications are an application that reproduces the content of the file with a rate corresponding with the timing of the contents, i.e. a movie is presented in real time to a user, and an application that downloads the file to another server. The first application requires a stream of a relatively low rate, whereas the second application would typically use a stream with a rate as high as possible in order to complete the task as quickly as possible.

The present invention allows determining the block size with which the file is accessed, on the basis of the rate requested by the application. When a request for a new stream is made, first a minimum block size to sustain an uninterrupted stream is determined. A block must be large enough to contain sufficient data to be consumed at the maximum rate of the new stream during the period in which the system fetches blocks from the disc. A suitable minimum block size, used in this embodiment, is given by the following equation:

$$B_{lowerb} = P \cdot c^{max} \quad (1)$$

wherein $B_{lowerb}$ is the minimum block size in bytes,

P is the maximum duration in seconds of the period in which the system operates, and $c^{max}$ is the maximum consumption rate of the new stream in bytes per second.

By subsequently dividing the minimum block size $B_{lowerb}$ by the sector size and ceiling, i.e. rounding up the result, the minimum block size $B_{lower}$ is obtained expressing the number of sectors that must at least be in a block in order to sustain the new stream.

A next step is to determine the number of times a block of size $B_{lower}$ fits in the cluster. This number is given by the following equation:

$$k = \text{floor}(C/B_{lower}) \quad (2)$$

wherein

C is the cluster size in numbers of sectors, and $B_{lower}$ is the minimum block size in numbers of sectors.

If this minimum block size is a divisor of the cluster size, then this block size is used to read the new stream. This is advantageous since the smaller the block size the smaller the requirement for memory space for the buffer is. Furthermore, it results in a smaller maximum bandwidth demand for accessing the disc for this stream. Because of the above, the cluster size C is preferably chosen to contain a large number of divisors. Then for many streams, the respective minimum block size may be a divisor of the cluster size, resulting in an optimal choice for the block size for these streams.

If the minimum block size $B_{lower}$ is not a divisor of the cluster size, not all sectors of the cluster can be read with k blocks of block size $B_{lower}$. To solve this, the remaining number of sectors is evenly divided over the k block size, thereby increasing the respective block sizes. This results in the situation wherein the cluster is completely read in k blocks, of which some have a block size that is one larger than some others. The block sizes for the block are calculated using the following equations:

$$(C \bmod k) \text{ blocks have a block size equal to ceiling } (C/k) \quad (3)$$

$$(k - C \bmod k) \text{ blocks have a block size equal to floor } (C/k) \quad (4)$$

wherein

C is the cluster size in numbers of sectors, and k is given according to the above equation (2).

So the file is read in blocks of different size, differing by at most 1 sector, to assure that the cluster is completely read by an integer number of blocks. This then assures that each block of the file can be read with one access to the disc. The order in which the different block sizes are used within a cluster does not matter, as long as the numbers of blocks of the different sizes are according to equation (3) and (4).

Due to edit operations or under other circumstances, a file may comprise clusters of mutually different sizes. In that case, respective block size or block sizes are determined for each different cluster size separately as described above. While reading the file, the block size or block sizes are used that have been calculated for the cluster that is currently being read. This provides a large flexibility to the reading application combined with an efficient usage of the system. The flexibility results in that the application may read the file with a block size that matches the desired consumption rate. The efficient usage is realized by choosing an optimal block size, i.e. as small as possible to sustain the stream with the desired rate, resulting in a smaller memory space for buffers and a smaller bandwidth for accessing the storage medium.

When a request for a new stream is received, the admission control module may verify whether the system has sufficient resources for this new stream in combination with existing streams. Examples of resources that may be verified are available memory space for buffers and available bandwidth for accessing the disc. The latter is particularly relevant in the present invention. The admission control module then verifies whether the maximum bandwidth demand of the new stream plus the maximum bandwidth demand of the existing streams at any time exceeds the minimum available bandwidth. This verification may be implemented by testing whether within a period of length P, which is the maximum duration of the operating period of the system, a block can be fetched from the disc for each of the streams. As described above, a stream may have different block sizes over time, the maximum possible block size used in a particular stream must be used in this test. In an embodiment of the system according to the invention, the following equation is used to test whether the new stream can be admitted:

$$P \geq \frac{\sum_{j=1}^{n+1} B_j}{r_{min}} + s(n+1) \quad (5)$$

in which:

$B_{j,\,upper}$ is the maximum block size of stream j, $r_{min}$ is the guaranteed transfer rate of the storage medium, n is the number of existing streams to which the new stream is added s (x) is the switching overhead for x accesses to the storage medium in a period P, and P is the maximum duration of period of fetching blocks from the storage medium.

FIG. 3 schematically shows a system for periodically writing blocks of data to a storage medium according to the invention. The construction of this system is very similar to the system for fetching blocks of data as shown in FIG. 1 and many parts are therefore the same. The system for writing blocks of data receives a stream of data with a certain rate. This stream may be received via a connection 108 as shown, but can also originate from another source, e.g. a tape unit. The stream is temporarily stored in a buffer space 118 from where blocks of data are written by a write module 302 to a file on the storage medium 106. The system operates in periods of a maximum duration P in which blocks of data for the various supported streams are written to a file. The file is organized in the same way as described above. The size of the blocks to be written to the disc are determined analogously to the size of the blocks fetched from disc, as described above.

Furthermore, the system for fetching and the system for writing may be combined into a single system supporting both types of stream. This system is able to read blocks from respective files on disc and supply the data as streams to respective users and is able to receive streams from external sources and write the data as blocks to respective files on disc. Such a combined system can be applied in a video on demand server. The video on demand server supplies a number of streams to respective users, e.g. presents movies stored on the disc to respective users, and receives one or more streams to be stored on disc, e.g. new movies to be added to the repertoire of the server. In this case, the video on demand server remains operational while new material is added to it. Another example of such a combined system is a video recording apparatus based on disc storage. Such an apparatus has one or more tuners receiving broadcast signals containing programs. The received programs can be stored on disc for later viewing. Storing a particular program can be explicitly programmed by the user or can be initiated automatically on the basis of a user profile. The user can select a certain stored program for viewing. Then, the blocks of data are read from the particular file and presented as a stream to the display device of the user. The apparatus is arranged to store one or more programs that are currently received and at the same time present earlier stored material to the user. In this situation, the system is fast enough to store the incoming streams on the disc and to supply an uninterrupted stream to the user.

It should be noted that the above-mentioned embodiments illustrate rather than limit the invention and that those skilled in the art will be able to design many alternative embodiments without departing from the scope of the appended claims. In the claims, any reference signs placed between parentheses shall not be construed as limiting the claim. The word 'comprising' does not exclude the presence of elements or steps other than those listed in a claim. The word "a" or "an" preceding an element does not exclude the presence of a plurality of such elements. The invention can be implemented by means of hardware comprising several distinct elements and by means of a suitably programmed computer. In the device claim enumerating several means, several of these means can be embodied by one and the same item of hardware.

The invention claimed is:

1. A system for periodically fetching blocks of data from a storage medium and supplying the blocks in the form of streams, wherein the blocks of data are fetched from a file comprising logically successive clusters, a cluster having a cluster size C and having physically successive storage sectors for holding the data, the system comprising:

admission control means for controlling the admission of a new stream having a maximum bit rate $c^{max}$, and read means for in a period of maximum duration P fetching blocks of data from the storage medium for respective ones of the streams, wherein the admission control means is arranged:

to determine a minimal block size $B_{lower}$ for the blocks for the new stream whereby a block of size $B_{lower}$ is sufficiently large to sustain consumption at rate $c^{max}$ during a period of length P, to determine the number of times k a block of size $B_{lower}$ fits in the cluster of size C, to determine for k blocks to be used for reading the cluster a respective block size by evenly partitioning the cluster size C into the k block sizes so as to arrange that the cluster can be completely read by means of the k blocks, and to determine the minimal block size $B_{lower}$ according to the following equation:

$$B_{lower} = P \cdot c^{max}.$$

2. A system as claimed in claim 1, wherein the admission control means is arrange to determine k according to the following equation:

$$k = \text{floor}(C/B_{lower}),$$

in which C and $B_{lower}$ are expressed in numbers of sectors.

3. A system as claimed in claim 1, wherein the admission control means is arranged to determine for the k blocks to be used for reading the cluster that
(C mod k) blocks have a block size equal to ceiling (C/k), and
(k−C mod k) blocks have a block size equal to floor (C/k).

4. A system as claimed in claim 1, wherein the respective block sizes for the k blocks for reading the cluster are mutually the same and a divisor of C, the cluster size C and the respective block sizes being expressed in numbers of sectors.

5. A system as claimed in claim 1, wherein the cluster size C has as divisors at least the numbers 2, 3, 4, 5, 6, 7, 8, 9 and 10, the cluster size C being expressed in numbers of sectors.

6. A system as claimed in claim 1, wherein the admission control means is arranged to determine a maximum block size $B_{upper}$ for the blocks of the new stream whereby a block of size $B_{upper}$ is sufficiently small to be fetched from the storage medium within a period of length P while in the same period blocks are fetched for the existing streams, and wherein the admission control means is arranged to deny the admission of the new stream if that stream requires for at least one of the k blocks used for reading the cluster a block size larger than the maximum block size $B_{upper}$.

7. A system as claimed in claim 1, wherein the admission control means is arranged to determine the maximum block size $B_{upper}$ according the following equation:

$$P \geq \frac{\sum_{j=1}^{n+1} B_j}{r_{min}} + s(n+1)$$

in which:
$B_{j,\,upper}$ is the maximum block size of stream j,
$r_{min}$ is the guaranteed transfer rate from the storage medium,
n is the number of existing streams to which the new stream is added
s(x) is the switching overhead for x accesses to the storage medium in a period P, and
P is the maximum duration of period of fetching blocks from the storage medium.

8. A system for periodically writing blocks of data to a storage medium, whereby the blocks are received in the form of streams, wherein the blocks of data are stored into a file comprising logically successive clusters, a cluster having a cluster size C and having physically successive storage sectors for storing the data, the system comprising:
admission control means for controlling the admission of a new stream having a maximum bit rate $c^{max}$, and
write means for in a period of maximum duration P storing blocks of data to the storage medium for respective ones of the streams,
wherein the admission control means is arranged:
to determine a minimal block size $B_{lower}$ for the blocks for the new stream whereby a block of size $B_{lower}$ is sufficiently large to store data received at rate $c^{max}$ during a period of length P,
to determine the number of times k a block of size $B_{lower}$ fits in the cluster of size C, to determine for k blocks to be used for writing to the cluster a respective block size by evenly partitioning the cluster size C into the k block sizes so as arrange that the cluster can be completely written by means of the k blocks, and to determine the minimal block size $B_{lower}$ according to the following equation:

$$B_{lower}=P \cdot c^{max}.$$

9. Method of periodically fetching blocks of data from a file on a storage medium and supplying the blocks in the form of streams, wherein the blocks of data are fetched from a file comprising logically successive clusters, a cluster having a cluster size C and having physically successive storage sectors for holding the data, the method comprising the steps of:
controlling the admission of a new stream having a maximum bit rate $c^{max}$, and
periodically fetching blocks of data from the storage medium for respective ones of the streams, a period having a maximum duration P,
whereby controlling the admission includes:
determining a minimal block size $B_{lower}$ for the blocks for the new stream whereby a block of size $B_{lower}$ is sufficiently large to sustain consumption at rate $c^{max}$ during a period of length P,
determining the number of times k a block of size $B_{lower}$ fits in the cluster of size C, determining for k blocks to be used for reading the cluster a respective block size by evenly partitioning the cluster size C into the k block sizes so as to arrange that the cluster can be completely read by means of the k blocks, and determining the minimal block size $B_{lower}$ according to the following equation:

$$B_{lower}=P \cdot c^{max}.$$

10. Method of periodically writing blocks of data to a file on a storage medium, whereby the blocks are received in the form of streams and whereby the blocks of data are stored into a file comprising logically successive clusters, a cluster having a cluster size C and having physically successive storage sectors for storing the data, the method comprising the steps of:
controlling the admission of a new stream having a maximum bit rate $c^{max}$, and
periodically storing blocks of data to the storage medium for respective ones of the streams, a period having a maximum duration P,
whereby controlling the admission includes:
determining a minimal block size $B_{lower}$ for the blocks for the new stream whereby a block of size $B_{lower}$ is sufficiently large to store data received at rate $c^{max}$ during a period of length P,
determining the number of times k a block of size $B_{lower}$ fits in the cluster of size C,
determining for k blocks to be used for writing to the cluster a respective block size by evenly partitioning the cluster size C into the k block sizes so as arrange that the cluster can be completely written by means of the k blocks, and determining the minimal block size $B_{lower}$ according to the following equation:

$$B_{lower}=P \cdot c^{max}.$$

* * * * *